US011537672B2

(12) United States Patent
Goenka et al.

(10) Patent No.: US 11,537,672 B2
(45) Date of Patent: Dec. 27, 2022

(54) METHOD AND SYSTEM FOR FILTERING CONTENT

(71) Applicant: YAHOO ASSETS LLC, Dulles, VA (US)

(72) Inventors: Mohit Goenka, Santa Clara, CA (US); Ashish Khushal Dharamshi, Sunnyvale, CA (US); Nikita Varma, Milpitas, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 158 days.

(21) Appl. No.: 16/132,629

(22) Filed: Sep. 17, 2018

(65) Prior Publication Data

US 2020/0089809 A1    Mar. 19, 2020

(51) Int. Cl.
*G06F 16/9535*   (2019.01)
*G06F 16/35*     (2019.01)
*G06F 16/33*     (2019.01)
*G06F 16/9038*   (2019.01)

(52) U.S. Cl.
CPC ...... *G06F 16/9535* (2019.01); *G06F 16/3349* (2019.01); *G06F 16/355* (2019.01); *G06F 16/9038* (2019.01)

(58) Field of Classification Search
CPC ............... G06F 16/9535; G06F 16/355; G06F 16/3349; G06F 16/9038
See application file for complete search history.

(56) References Cited

U.S. PATENT DOCUMENTS

| | | | | |
|---|---|---|---|---|
| 8,214,380 B1* | 7/2012 | Bettinger | ............ | G06F 16/9535 707/758 |
| 9,824,117 B1* | 11/2017 | Adogla | ............... | G06F 16/2433 |
| 10,503,793 B2* | 12/2019 | Joshi | .................... | G06F 16/9535 |
| 2006/0242098 A1* | 10/2006 | Wnek | ..................... | G06F 16/33 707/E17.061 |
| 2008/0306913 A1* | 12/2008 | Newman | ............... | G06F 16/972 707/E17.061 |
| 2009/0198675 A1* | 8/2009 | Mihalik | ............... | G06F 3/04842 |
| 2012/0072432 A1* | 3/2012 | Crosa | .................. | G06F 16/9535 707/748 |
| 2013/0254217 A1* | 9/2013 | Xu | ....................... | G06F 16/9535 707/754 |
| 2014/0114942 A1* | 4/2014 | Belakovskiy | ......... | G06F 16/328 707/706 |
| 2016/0034525 A1* | 2/2016 | Neels | ..................... | G06F 16/285 707/737 |
| 2016/0218997 A1* | 7/2016 | Patil | ....................... | G06N 20/00 |
| 2017/0017724 A1* | 1/2017 | MacGillivray | ..... | G06F 16/9535 |
| 2018/0219969 A1* | 8/2018 | Filev | .................... | G10L 15/1822 |
| 2018/0307748 A1* | 10/2018 | Freilinger | ............. | G06F 16/337 |
| 2019/0042652 A1* | 2/2019 | Zavrel | .................... | G06Q 10/10 |
| 2020/0089809 A1* | 3/2020 | Goenka | .................. | G06F 16/355 |

\* cited by examiner

*Primary Examiner* — Vincent F Boccio
*Assistant Examiner* — Zuheir A Mheir
(74) *Attorney, Agent, or Firm* — Venable LLP

(57) ABSTRACT

The present teaching relates to methods, systems, and programming for information retrieval. A search result associated with a search query is obtained and provided to a user. Upon receiving a filtering request from the user, the search result is filtered based on the filtering request to generate an updated search result. The updated search result is provided to the user in response to the filtering request.

20 Claims, 19 Drawing Sheets

FIG. 6B

| User Name | Prune | | Asian | | Select Mode | | 96 entries |

Search Results for Restaurants

☐ Bombay Asian Club
☐ Panda Express
☐ Founding Farmers
☐ California Tortilla
☐ La Sandia Tex Grille
☐ P. F. Chang's Bistro Found 6 Restaurants
With Keyword "ASIAN"      620

CONFIRM  ☐ YES   ☐ NO

Suggested Refinement

☐ OK

☐ Korean BBQ & Grill
☐ Chipotle
☐ Masala Indian Cuisine
☐ Asian Bistro

| Previous Page ⬇ | Next Page ⬆ |

FIG. 6C

| User Name | Prune | Asian | | Select Mode | 90 entries |

601-e

Search Results for Restaurants

☐ Panda Express
☐ Founding Farmers
☐ California Tortilla
☐ La Sandia Tex Grille
☐ P. F. Chang's Bistro

625

☐ Korean BBQ & Grill
☐ Chipotle
☐ Masala Indian Cuisine
☐ MacDonald's

| Previous Page ⬇ | Next Page ⬆ |

FIG. 6D

| User Name | Prune | Asian | | Select Mode | 6 entries |

601-b, 601-d, 601-e

Search Results for Restaurants

☐ Bombay Club Asian
☐ Asian Bistro
☐ Spices Asian Restaurant and Sushi Bar
☐ Asian Hunan Grill
☐ Royal Asian Oriental Buffet
☐ Asian Seafood Wok

Figure 6G:
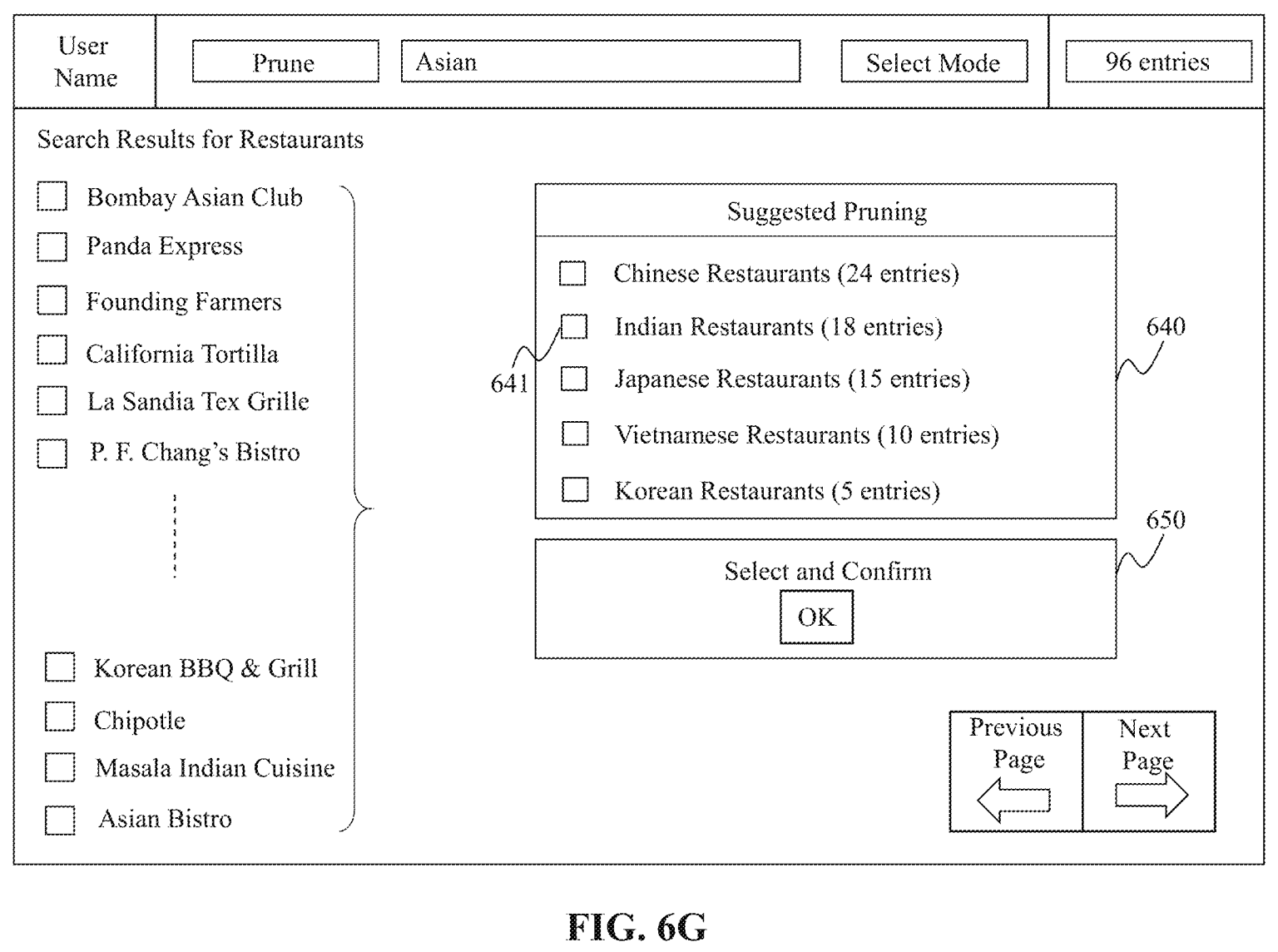

| User Name | Prune | Asian | Select Mode | 96 entries |

Search Results for Restaurants

- ☐ Bombay Asian Club
- ☐ Panda Express
- ☐ Founding Farmers
- ☐ California Tortilla
- ☐ La Sandia Tex Grille
- ☐ P. F. Chang's Bistro

- - - - - - -

- ☐ Korean BBQ & Grill
- ☐ Chipotle
- ☐ Masala Indian Cuisine
- ☐ Asian Bistro

Suggested Pruning — 640

- ☐ Chinese Restaurants (24 entries) — 641
- ☐ Indian Restaurants (18 entries)
- ☐ Japanese Restaurants (15 entries)
- ☐ Vietnamese Restaurants (10 entries)
- ☐ Korean Restaurants (5 entries)

Select and Confirm — 650

[ OK ]

Previous Page ⬇   Next Page ⬆

| User Name | Prune | Asian | | Select Mode | 78 entries |

601-e

Search Results for Restaurants

645

☐ Panda Express
☐ Founding Farmers
☐ California Tortilla
☐ La Sandia Tex Grille
☐ P. F. Chang's Bistro

- - - - -

☐ Korean BBQ & Grill
☐ Chipotle
☐ MacDonald's
☐ Silver Diner

| Previous Page ⬇ | Next Page ⬆ |

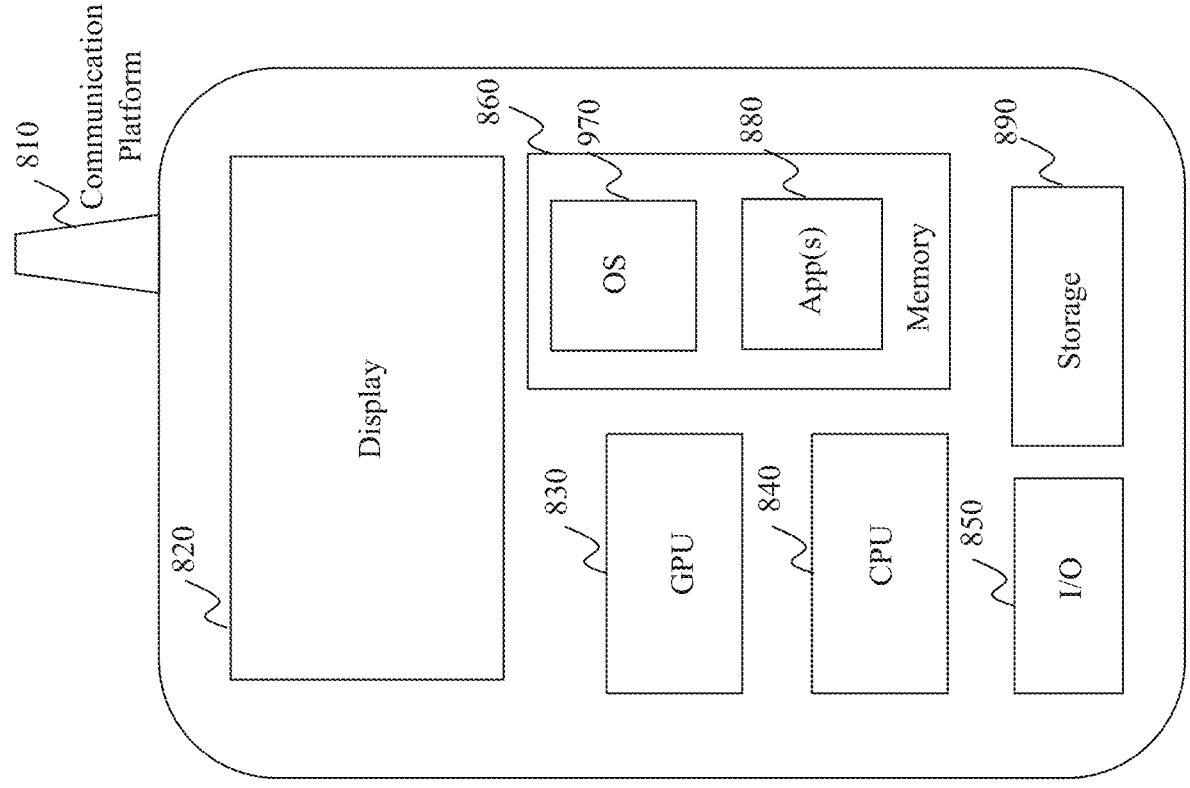

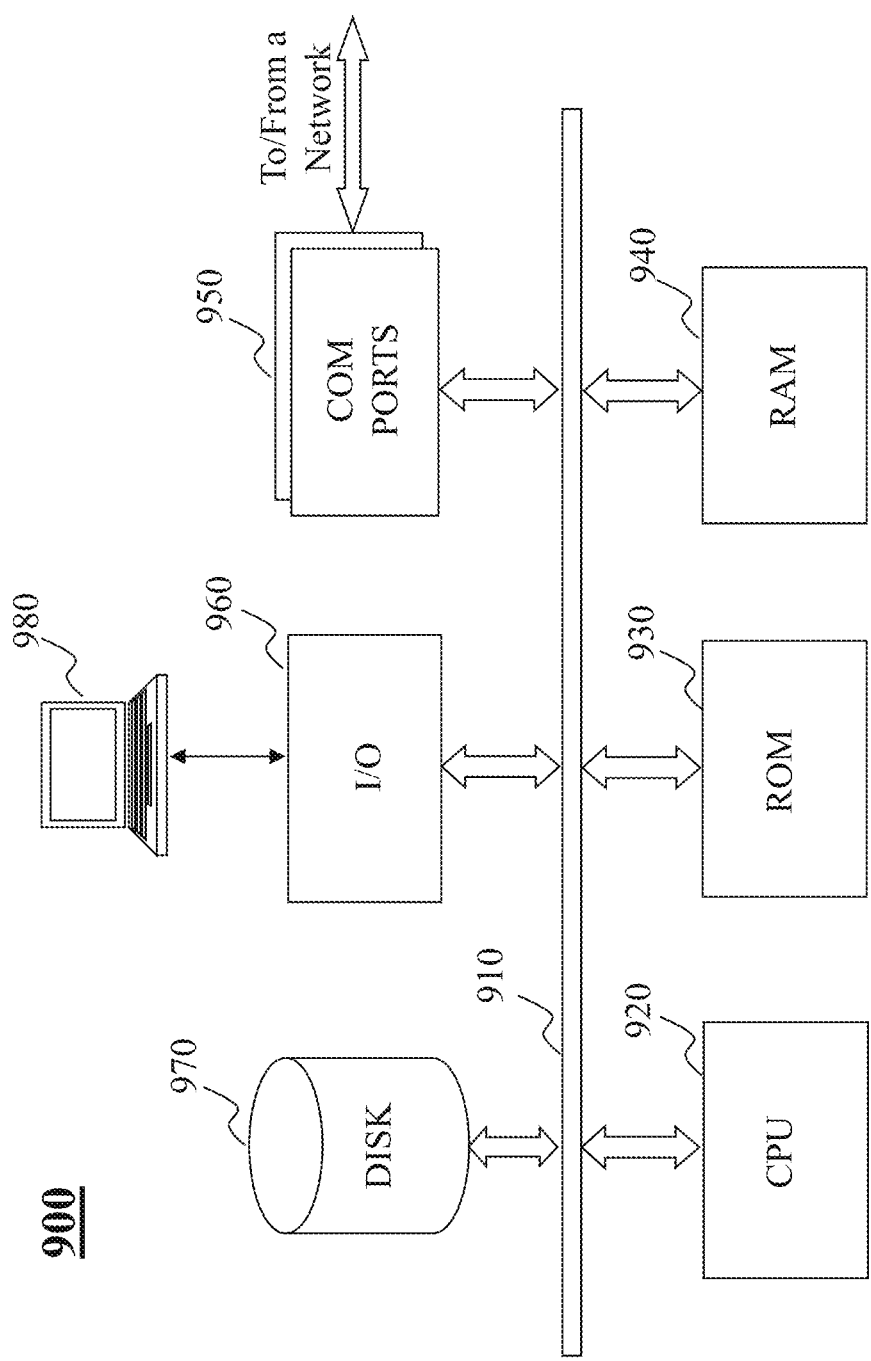

METHOD AND SYSTEM FOR FILTERING CONTENT

BACKGROUND

1. Technical Field

The present teaching generally relates to methods, systems, and programming for information retrieval. Particularly, the present teaching is directed to methods, systems and programming for filtering content.

2. Technical Background

A search engine is one type of information retrieval system that is designed to help users search for and obtain access to information that is stored in a computer system or across a network of computers. In response to a query from a user, a search engine can search different sources online to obtain search results matching the query. For example, as shown in FIG. 1, which is a high-level depiction of an information searching system, search queries are typically issued by users 110, and transmitted to a search server 140 via a network 120. Based on the search query, the search sever 140 may search documents from content sources 160 and/or other sources on the network such as databases 150, and return searched content to the user.

Typically, the percentage of irrelevant search results is critical for search quality. If a user observes a high number of irrelevant search results, the user is forced to conduct another search operation by issuing another query to the search server. However, it is not guaranteed that the additional search operation will provide only relevant results to the user. Multiple search operations are incurred as there is no mechanism for the user to exclude certain items or entities from the search result. Moreover, the user may be unaware of certain items or entities (at the time of issuing the search query) until the search results are actually provided to the user. Additionally, the latency incurred due to successive calls to the search server may be unacceptable. Such situations typically deteriorate the user's search experience causing the user to give up on the current search server and switch to a competitor's server.

A similar situation occurs in the case of a user performing online shopping on a website. For instance, consider that the user is shopping for electronic gadgets but is not interested in a particular gadget (e.g., a camera). Typically, the user is provided with multiple categorical options such as camera, computers, tablets, headphones, printers, etc., on a webpage. Given that the user is not interested in shopping for a camera, the user would typically have to select each category other than camera before issuing the search query. Such a shopping experience is time consuming. Moreover, the search may result in the user receiving unwanted shopping items (i.e., irrelevant results) in the categories in which the user is interested. Thus, there is a need to devise a solution to address the above stated problems.

SUMMARY

The teachings disclosed herein relate to methods, systems, and programming for filtering search content.

In one example, there is provided a method, implemented on a machine having at least one processor, storage, and a communication platform capable of connecting to a network for providing search results. The method includes the steps of obtaining a search result associated with a search query, and providing the search result to a user. Upon receiving a filtering request from the user, the method filters the search result based on the filtering request to generate an updated search result. The updated search result is provided to the user in response to the filtering request.

In a different example, a system for providing search results is disclosed. The system includes a search results processing unit implemented by a processor and configured to obtain a search result associated with a search query. A results transmitting unit implemented by the processor is configured to provide the search result to a user, and a results updating unit implemented by the processor is configured to receive a filtering request from the user. The system further includes a filtering unit implemented by the processor and configured to filter the search result based on the filtering request to generate an updated search result. The updated search result is provided to the user in response to the filtering request.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided a non-transitory computer readable medium including computer executable instructions, wherein the instructions, when executed by a computer, cause the computer to perform a method for providing search results. The method includes the steps of obtaining a search result associated with a search query, and providing the search result to a user. Upon receiving a filtering request from the user, the method filters the search result based on the filtering request to generate an updated search result. The updated search result is provided to the user in response to the filtering request.

Additional advantages and novel features will be set forth in part in the description, which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 6A-6I illustrate exemplary user-interfaces configured to display a search result, according to various embodiments of the present teaching;

FIG. 7 illustrates an exemplary interface depicting search result pruning of email content of a user, according to various embodiments of the present disclosure;

FIG. 8 depicts an architecture of a mobile device which can be used to implement a specialized system incorporating the present teaching; and FIG. 9 depicts the architecture of a computer, which can be used to implement a specialized system incorporating the present teaching.

DETAILED DESCRIPTION

Figure 1:
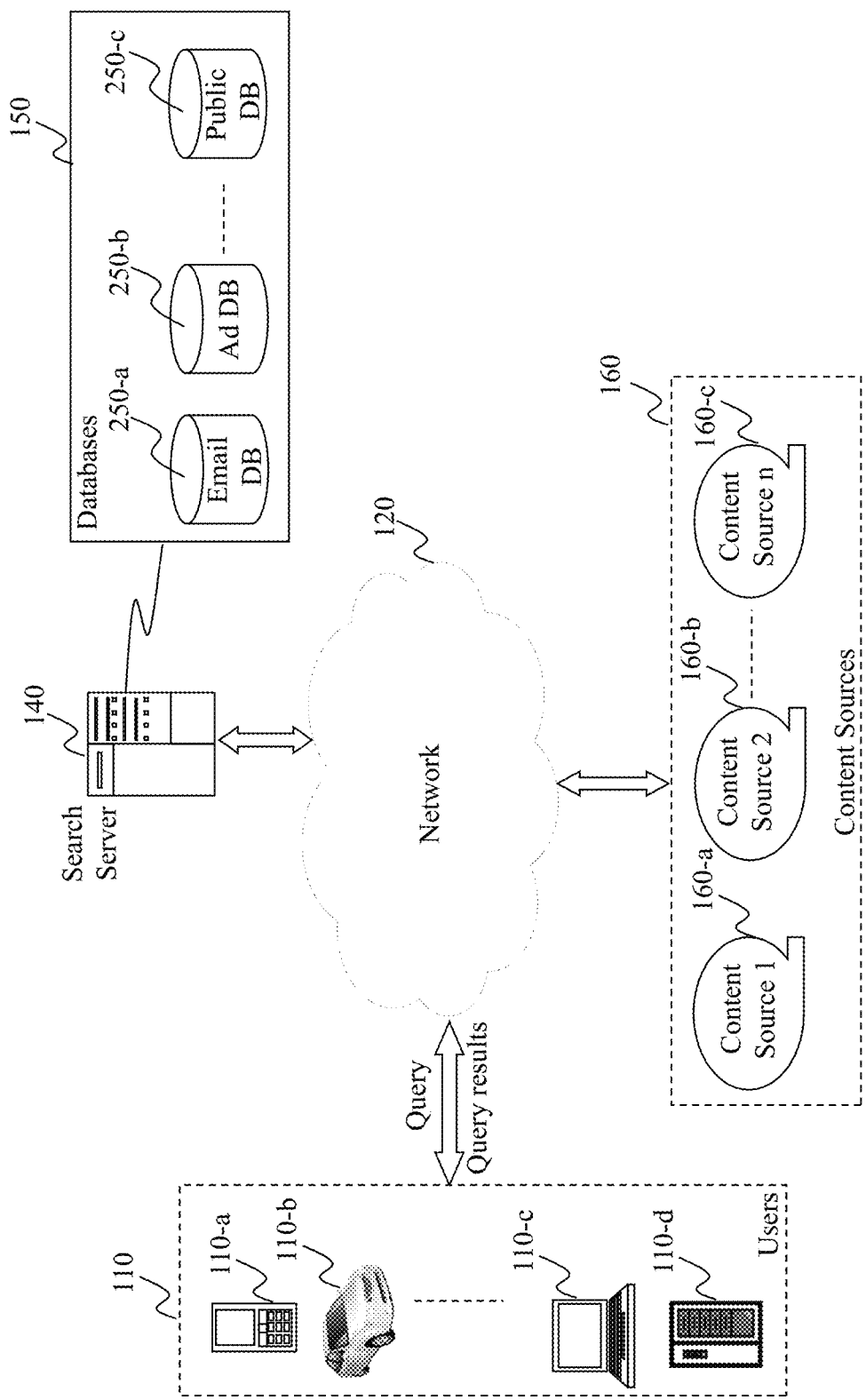
FIG. 1 (PRIOR ART) is a high-level depiction of an information searching system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 2A:
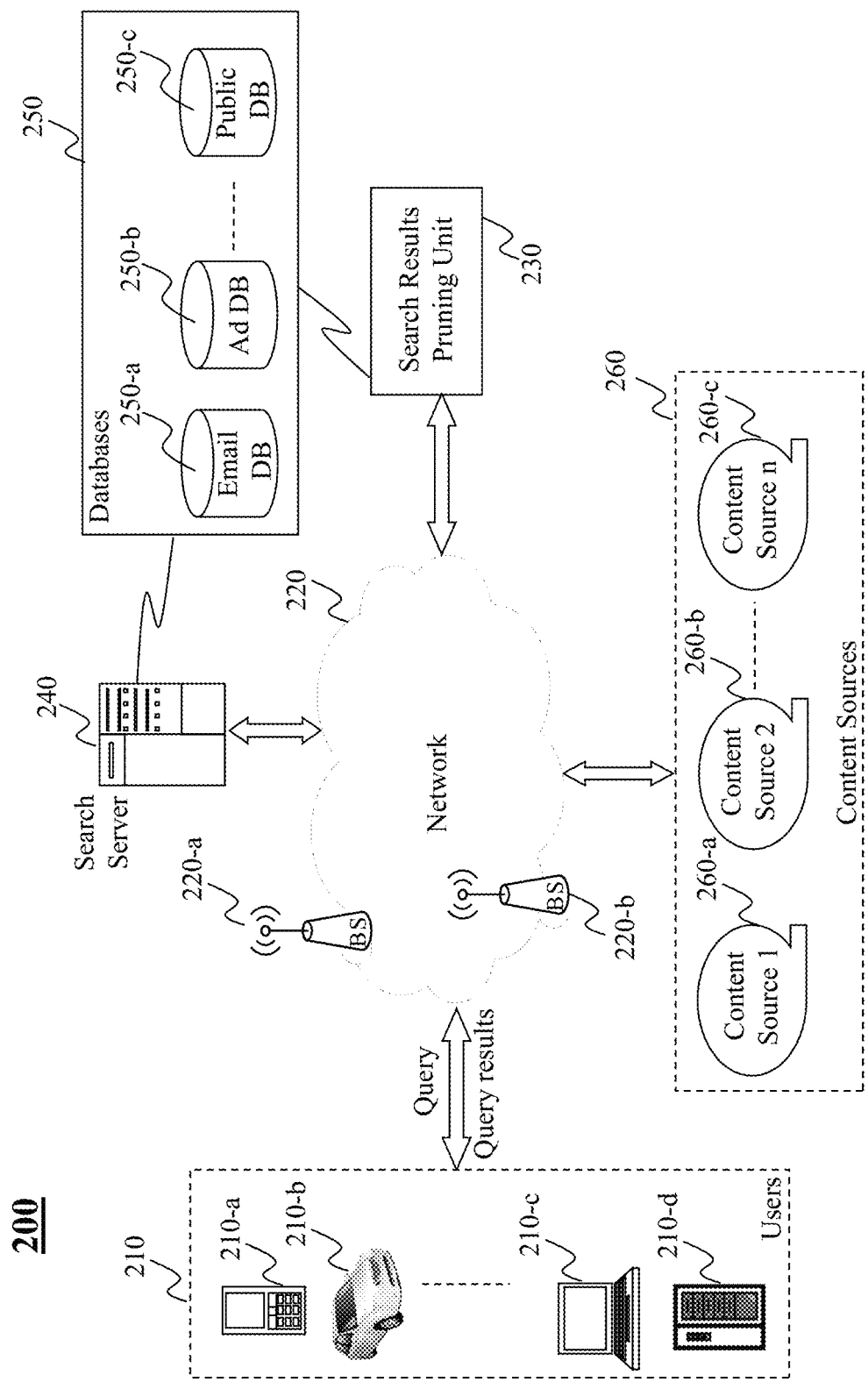
FIGS. 2A-2C depict different operational configurations of pruning search results, according to various embodiments of the present teaching.
Figure 2B:
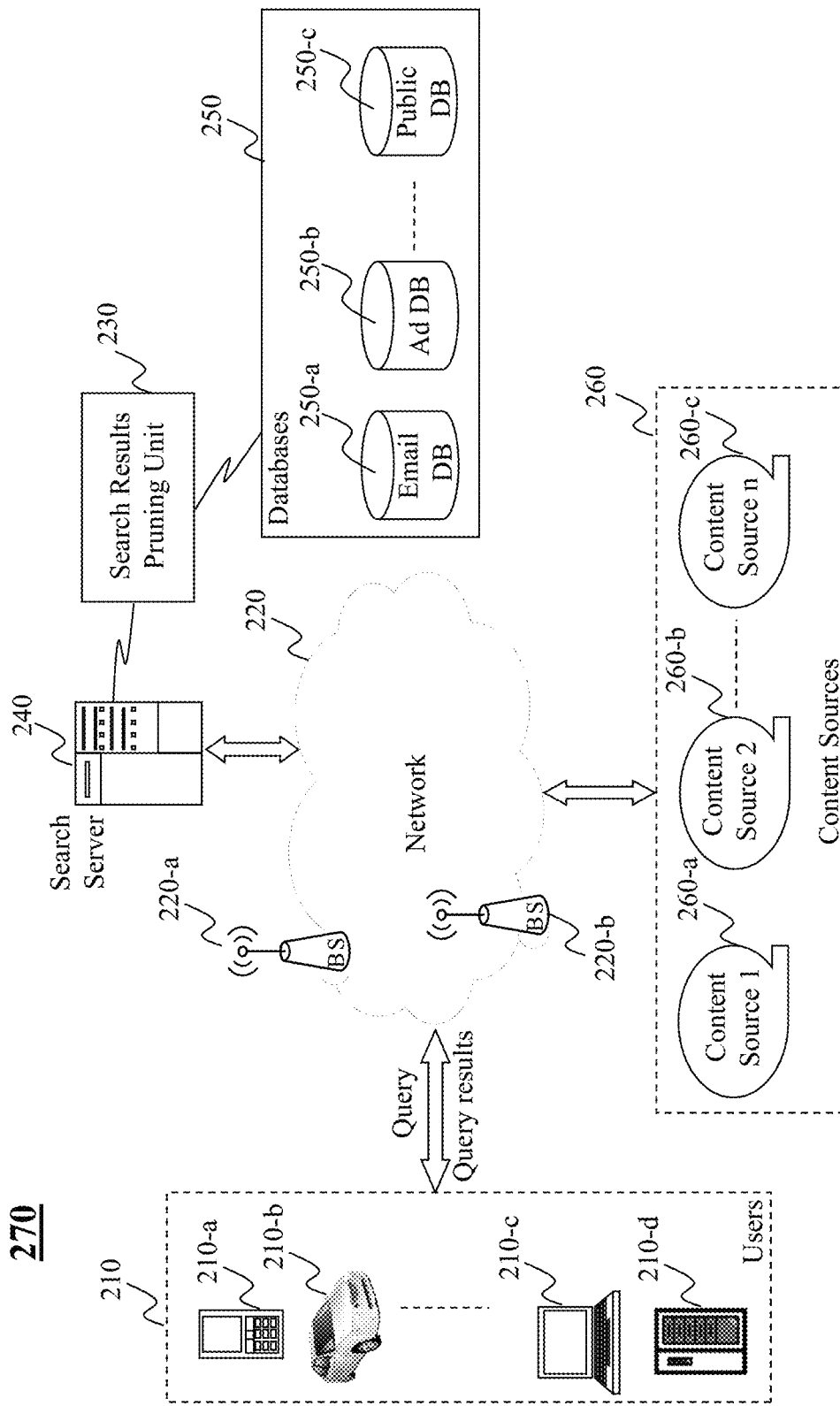
Figure 2C:
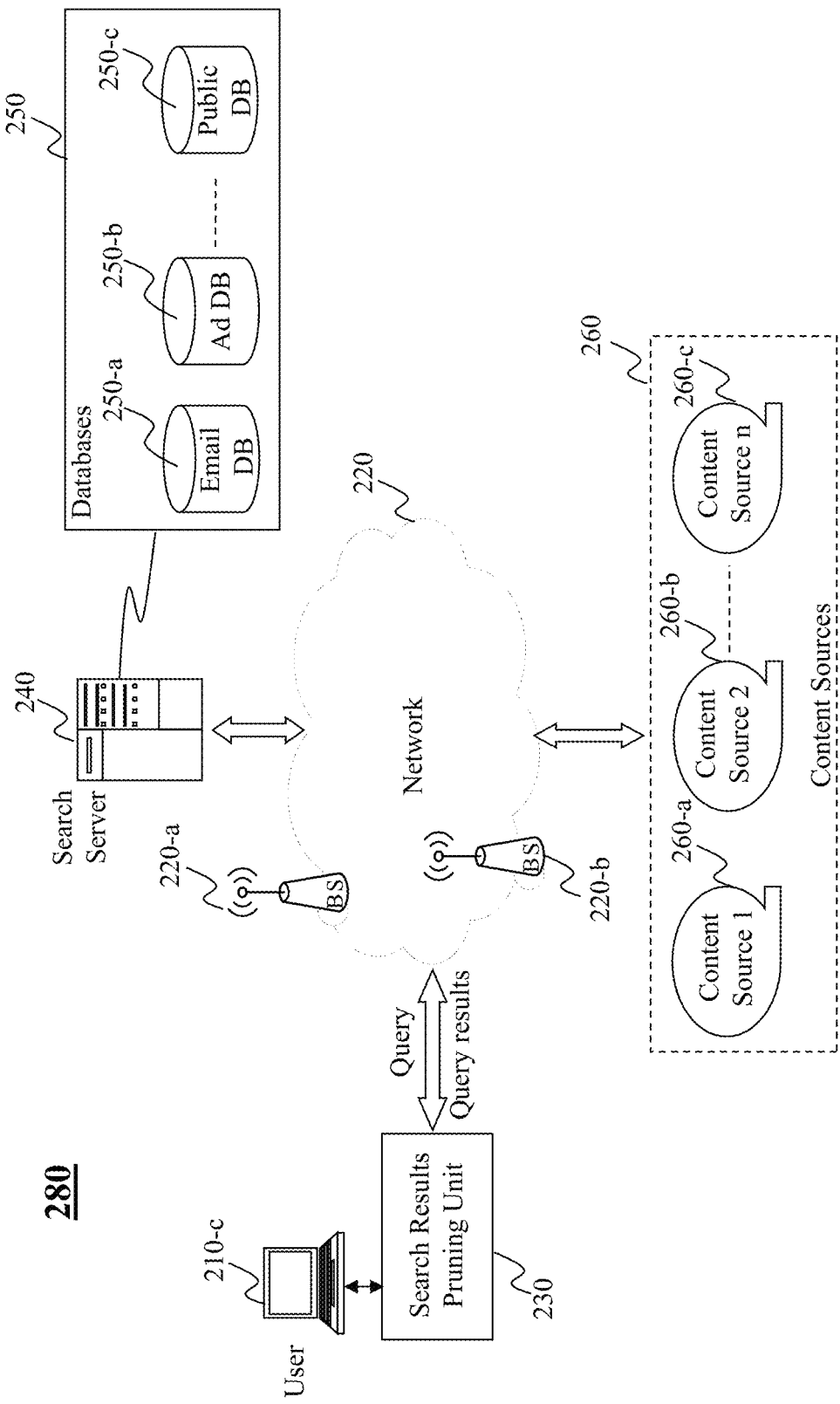

FIGS. 2A-2C depict different operational configurations of pruning search results in a network setting, according to different embodiments of the present teaching. In FIG. 2A, an exemplary system configuration 200 includes users 210, a network 220, a search server 240, content sources 260 including content source 1 260-a, content source 2 260-b, . . . , content source n 260-c, a plurality of databases 250 including an email database 250-a, an advertisement database 240-b, . . . . , public database 250-c, etc., and a search results pruning unit 230. The search results pruning unit 230 provides a service of removing irrelevant entities included in a search result associated with a search query.

Users 210 may be of different types such as users connected to the network via desktop connections (210-d), users connecting to the network via wireless connections such as through a laptop (210-c), a handheld device (210-a), or a built-in device in a motor vehicle (210-b). A user may send a query to the search server 240 via the network 220 and receive a search result from the search server 240 through the network 220. The user's query may be handled by the search server 240, which may search documents based on the query from the content sources 260 and/or other sources on the network 220 such as the plurality of databases 250.

The network 220 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a Bluetooth network, a virtual network, or any combination thereof. The network 220 may also include various network access points (220-a and 220-b) e.g., wired or wireless access points such as base stations or Internet exchange points through which a data source may connect to the network 220 in order to transmit/receive information via the network.

The content sources 260 may correspond to content/app providers, which may include, but not limited to, to an individual, a business entity, or a content collection agency such as Twitter, Facebook, or blogs, that gather different types of content, online or offline, such as news, papers, blogs, social media communications, magazines, whether textual, audio visual such as images or video content. The content from content sources 260 include multi-media content or text or any other form of content including web site content, social media content from, e.g., Facebook, Twitter, Reddit, etc., or any other content generators. The gathered content may be licensed content from providers such as AP and Reuters. It may also be content crawled and indexed from various sources on the Internet. Content sources 260 provide a vast range of content that are searchable.

In operation, the user issues a search query, which is transmitted to the search server 240 via the network 220. In response to receiving the search query, the search server 240 searches different sources (i.e., databases 250, content sources 260 etc.) to obtain a search result matching the query. The search server 240 may also employ a ranking mechanism that ranks individual items included in the obtained search result and presents the search result to the user.

Upon receiving the search result associated with the query, the user may invoke the search results pruning unit 230 for further processing the obtained search result. As stated before, the search results pruning unit 230 provides the service of removing irrelevant entities/keywords that may be included in the search result associated with the search query. Specifically, as will be described later with reference to FIG. 4, the search results pruning unit 230 provides the user a flexibility of applying filter(s) on the obtained search result to exclude certain entities or keyword terms from the search result. In this manner, the search results pruning unit 230 provides a better search experience to the user by enabling the pruning (i.e., narrowing down or filtering) of the search result by excluding the items included in the search result that comprise entities/keywords that are not relevant to the user.

In the embodiment illustrated in FIG. 2A, the search results pruning unit 230 is a stand-alone service, and may provide its services to a plurality of search servers and users. In FIG. 2B, an alternative configuration is provided, in which the search results pruning unit 230 is connected to a search server 240 as its backend service engine. That is, in this embodiment, the search results pruning unit 230 is a special module in the backend of the search server 240. When there are multiple servers (not shown), each may have its own backend module for pruning search results. In FIG. 2C, yet another alternative configuration is provided, in which the search results pruning unit 230 may reside in the user's device 210-*c* and provide the flexibility of pruning the search result obtained from the search server 240. For instance, the search results pruning unit 230 may be installed as a specialized application ('App') on the user's device and provide the pruned results to the user via an interface (e.g., a graphical user interface).

Figure 3:
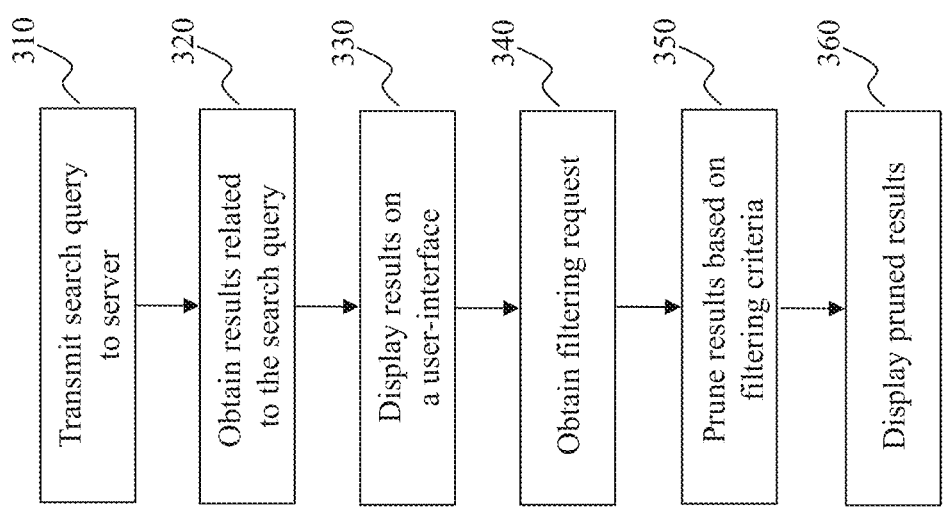
FIG. 3 is a flowchart of an exemplary search result pruning process, according to various embodiments of the present teaching.

FIG. 3 is a flowchart of an exemplary search result pruning process, according to various embodiments of the present teaching. The process commences in step 310 wherein a search query issued by a user is transmitted to a search server. At step 320, search result (including a plurality of search items) is obtained from the search server. The obtained search result is displayed to the user in step 330. In step 340, a filtering request is obtained from the user. The process then moves to step 350, wherein the search results pruning unit filters the obtained search result (of step 320) to generate an updated search result. Thereafter, in step 360 the updated search result is provided to the user in response to the filtering request.

Figure 4:
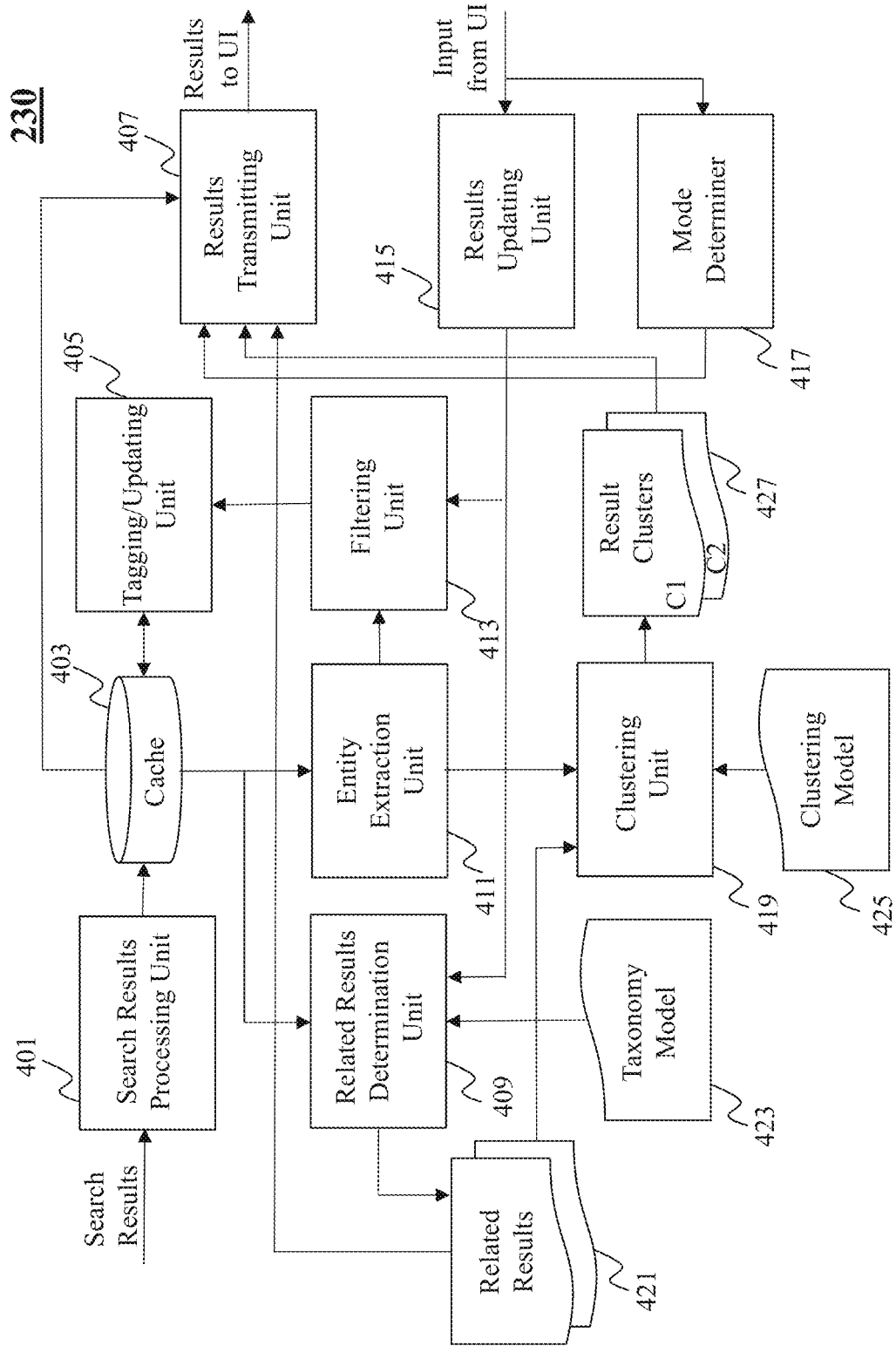
FIG. 4 depicts an exemplary system diagram of a search results pruning unit, according to various embodiments of the present teaching.

FIG. 4 depicts an exemplary system diagram of a search results pruning unit 230, according to various embodiments of the present teaching. As discussed herein, the search results pruning unit 230 is configured to prune the search result (obtained from a search sever) associated with a search query. Specifically, the search results pruning unit 230 is configured to filter the search result by discarding search items that are included in the search result, and which comprise an entity or a keyword(s) that are not desired by the user. In the illustrated embodiment, the search results pruning unit comprises a search results processing unit 401, a cache 403, a tagging/update unit 405, a results transmitting unit 407, a related results determination unit 409, an entity extraction unit 411, a filtering unit 413, a clustering unit 419, a mode determiner 417, and a results updating unit 415.

The search results processing unit 401 receives, from a search server, the search result associated with a search query issued by a user. By one embodiment, the search results processing unit 401 may pre-process (e.g., format) the obtained search result to be provided to the user for displaying in a manner dependent on a type of device, a size of a display of the device, etc, that is operated by the user. The formatted search result is stored in the cache 403, and transmitted to the results transmitting unit 407. The results transmitting unit 407 sends the search result to a user-interface (e.g., a graphical user interface) that displays the search result to the user.

The results updating unit 415 receives an input from the user. By one embodiment, the input includes a filtering request from the user. The filtering request indicates for instance, a keyword that the user wishes to exclude from the search result. The received filtering request is transmitted to the filtering unit 413 and the related results determination unit 409. The entity extraction unit 411 retrieves the search result stored in the cache 403, and extracts at least one entity from each search item of a plurality of search items that are included in the search result. The extracted at least one entity from each search item is send to the filtering unit 413.

By one embodiment, the filtering unit 413 compares the at least one extracted entity from each search item with the keyword included in the filtering request issued by the user. Upon determining a match between the at least one extracted entity and the keyword, the filtering unit 413 instructs the tagging/updating unit 405 to tag (i.e., mark) the corresponding search item. Further, the input from the user also includes a mode of filtering the search result. By one embodiment, the mode of filtering the search result may be one of a first mode of filtering and a second mode of filtering the search result. The first mode of filtering the search result corresponds to a scenario, wherein the user wishes to discard all the search items from the search result that include the keyword. In other words, in the first mode of filtering the search result, all the search items that are tagged by the tagging/updating unit 405 are discarded from the cache, and all the untagged search items are transmitted to the user-interface to be displayed. In contrast, the second mode of filtering the search result corresponds to a scenario, wherein the user wishes to discard all the search items from the search result that do not include the keyword. In other words, in the second mode of filtering the search result, all the search items that are untagged by the tagging/updating unit 405 are discarded from the cache, and all the tagged search items are transmitted to the user-interface to be displayed.

According to an embodiment of the present disclosure, the search results pruning unit 230 also provides the user with a flexibility of refining the search result in an advanced mode (referred to hereinafter as suggested refinement). In suggested refinement, the filtering request received by the results updating unit 415 is sent to the related results determination unit 409. In operation, the related results determination unit 415 utilizes a taxonomy model 423 to aggregate all search items in the search result that are similar (or related) with respect to the keyword included in the filtering request. The related results determination unit 409 generates the related results 421 in accordance with the taxonomy model 423 and provides the related results 421 to the results transmitting unit 407 for providing the related results to the user. Additionally, by one embodiment, the related results 409 may also be transmitted to the clustering unit 419 that utilizes a clustering model 425 in order to generate a plurality of result clusters 427 that can be provided to the user for further refinement of the search result. Examples illustrating the above-described mechanisms of filtering the search result are described next with reference to FIGS. 6A to 6H.

Figure 5:
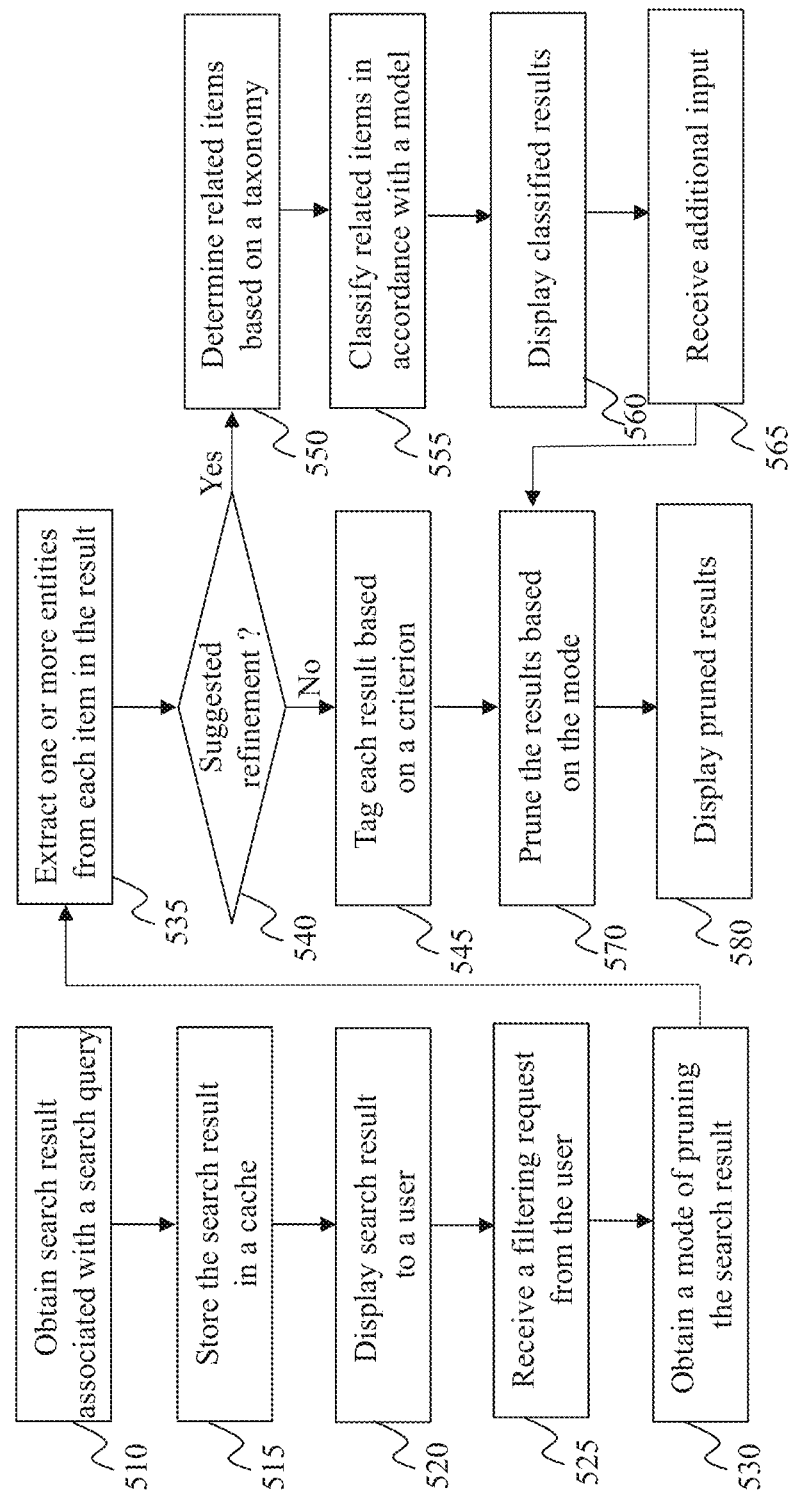
FIG. 5 is a flowchart of an exemplary process performed by a search results pruning unit, according to various embodiments of the present teaching.

Turning now to FIG. 5, there is depicted a flowchart of an exemplary process performed by the search results pruning unit 230, according to various embodiments of the present teaching. The process commences in step 510, wherein a search result associated with a search query is obtained from a search server. The obtained search result in stored in a cache of the search results pruning unit in step 515. In step 520, the search result is transmitted to a user-interface, such as a graphical user-interface to be displayed on a device operated by the user.

The process then moves to step 525, wherein a filtering request is obtained via the graphical user-interface. Note that by one embodiment, the filtering request includes a keyword that the user wishes to exclude from the search result. In step 530, the search results pruning unit also receives a mode of pruning the search result (i.e., a first mode or a second mode of pruning the search result).

Thereafter, in step 535, the process extracts at least one entity from each item included in the search result. In step 540, a query is performed to determine whether the user prefers a suggested refinement of the search result. If the response to the query in step 540 is negative, the process moves to step 545. However, if the response to the query of step 540 is affirmative, the process moves to step 550.

At step 545, the search results pruning unit tags each item in the search result based on a criterion. For example, as stated before, the search results pruning unit tags each item in the search result based on determining a match between the at least one entity extracted from the search item and the keyword included in the filtering request. In step 570, the search results pruning unit filters the search result based on the filtering mode, where after the pruned search result is transmitted to the graphical user-interface to be displayed to the user.

If the response to the query of step 540 is affirmative, the process moves to step 550 to determine a plurality of search items included in the search result that are related to the keyword included in the filtering request. Further, in step 555, the related search items are classified. Specifically, the search results pruning unit generates a plurality of related result clusters in accordance with a clustering model. In step 560, the generated result clusters are transmitted to the graphical user interface to be displayed to the user. Further, in step 565, the search results pruning unit receives additional input indicating the user's preference of filtering the search result based on the provided result clusters. The process then moves to step 570 to prune the search result and further transmit the pruned search result to the user interface to be displayed to the user.

Figure 6A:
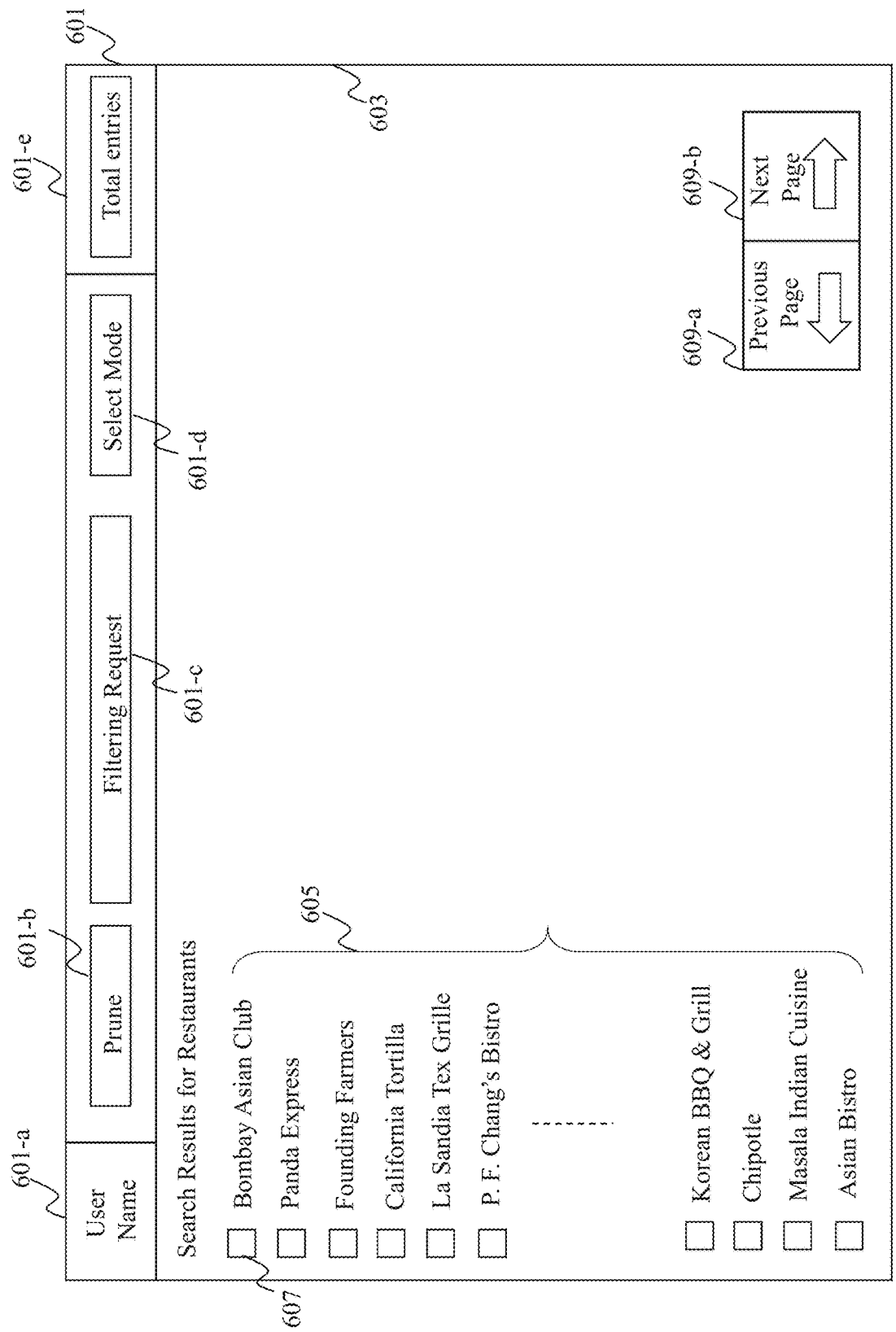

FIGS. 6A-6I illustrate exemplary user-interfaces configured to provide a search result to the user, according to various embodiments of the present teaching. The user-interfaces as depicted in FIGS. 6A to 6H may be a graphical user-interface (referred to herein after as graphical interface) configured to provide the search result and an updated search result to the user. As shown in FIG. 6A, the graphical interface includes a toolbar 601 and a search result presenting area 603. The toolbar 601 includes a portion 601-*a* to display a name of the user operating the device, and a result icon 601-*e* that displays a number of items included in the search result.

Further, the toolbar 601 includes a pruning icon 601-*b*, a filtering request icon 601-*c*, and a select mode icon 601-*d*. The pruning icon 601-*b*, filtering request icon 601-*c*, and the select mode icon 601-*d* may be adapted to receive a user input (e.g., via a touch operation performed by the user) to perform respective functions as described herein. For example, the user may initiate a pruning of the search result by selecting the pruning icon 601-*b*. Similarly, the user may enter a keyword that is to be used for pruning the search result by selecting the filtering request icon 601-*c* and entering the keyword using a keyboard associated with the device. The mode of filtering the search result can be input by selecting the select mode icon 601-*d* and entering a desired mode (i.e., a first or second mode) of filtering. Alternatively, the desired mode of filtering may also be selected from a drop-down menu that is displayed to the user upon selecting the select mode icon 601-*d*.

The search result presenting area 603 is adapted to display the search result associated with a query initiated by the user. For example, as shown in FIG. 6A, the search result presenting area 603 displays the search result 605 that corresponds to a list of restaurants. Note that an initial search result 605 (obtained from a server) that is displayed to the user corresponds to a query initiated by the user, which in the present case may be 'find restaurants near my location', 'find restaurants', or the like. The search result presenting area 603 also includes two icons 609-*a* and 609-*b* that correspond to 'previous page' and 'next page' icons, respectively. These icons may be embedded in the search result presenting area 603 and enable the user to scroll through the list of items included in the search result. Across each item in the search result 605, there is provided a selection tab 607 that enables a user to select a particular item.

Figure 6B:
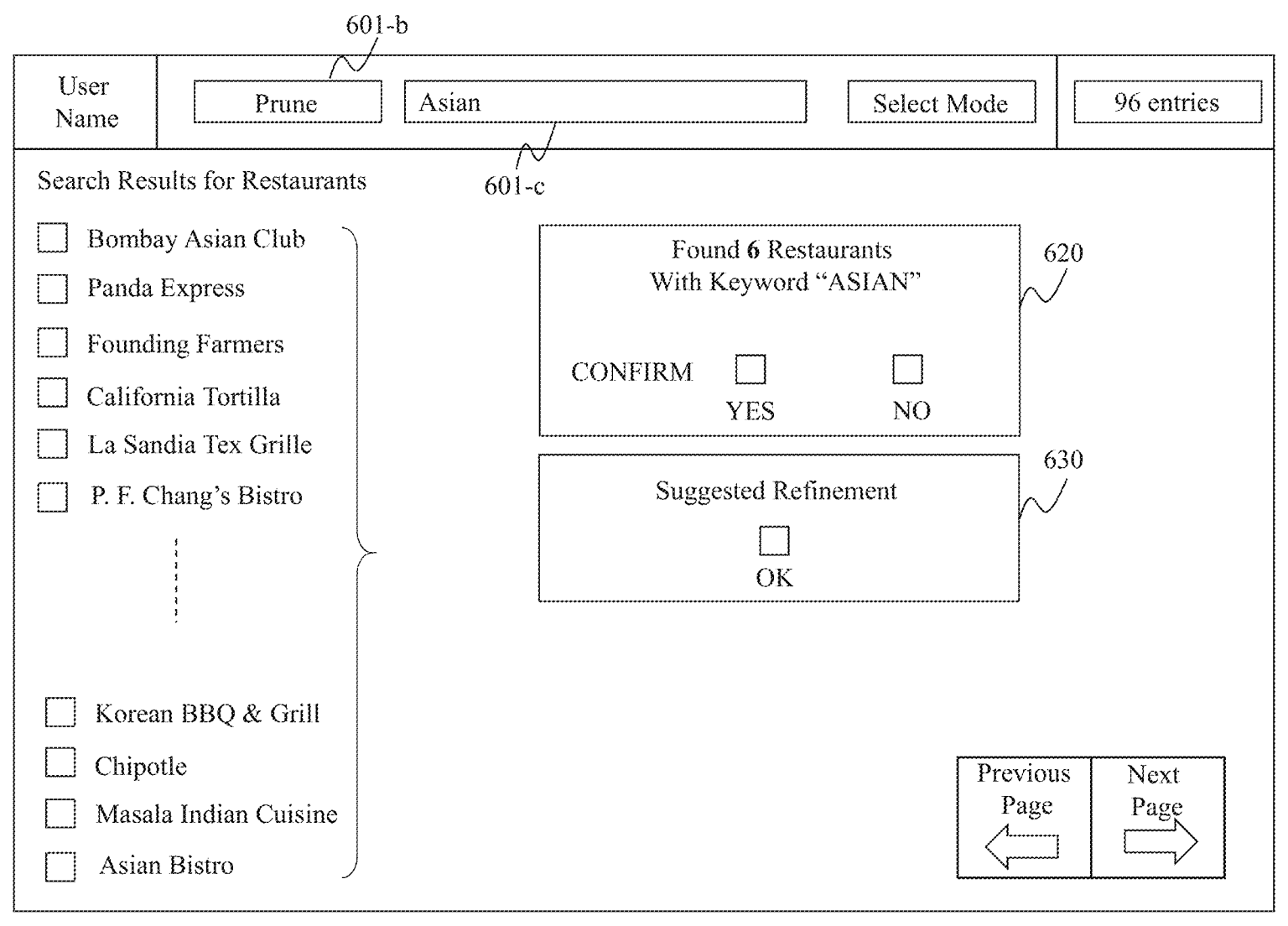

FIG. 6B illustrates a filtering operation initiated by the user. In this example, upon receiving the search result (i.e., 96 entries corresponding to the query of finding restaurants), the user selects the filtering request icon and enters a keyword 'Asian' to filter out any item that includes this keyword. Upon the user selecting the pruning option (icon 601-*b*), a number of search items satisfying the criterion (i.e., including the keyword 'Asian') are displayed in a pop-up block 620. For example, as shown in FIG. 6B, the pruning operation resulted in six restaurants that included the keyword 'Asian'. Further, a message 'Confirm' may also be displayed in the pop-up block 620 requesting the user to perform a selection (i.e. a yes or no selection). By one embodiment, an advanced mode of filtering the search result (i.e., suggested refinement) may be displayed in another pop-up block 630. Details regarding the suggested refinement feature are described next.

Upon the user making a selection in the pop-up block 620 (FIG. 6C), an updated search result 625 is displayed in the result presenting area. For example, in the illustration of FIG. 6D, the original search items such as 'Bombay Asian Club', 'Asian Bistro' and other search items that included the keyword 'Asian' are deleted from the cache of the search results pruning unit. The remaining items (i.e., the items that do not include the keyword 'Asian') are presented to the user as the updated search result 625. Moreover, the total number of restaurants is updated to ninety restaurants in the result icon 601-*e*.

FIG. 6E illustrates a display of the search result upon the user selecting a second mode of filtering. Specifically, in this mode, the search results pruning unit maintains the search items that include the keyword 'Asian' in the cache, and discards the remaining search items. All six items that include the keyword 'Asian' are depicted as the updated search result 635 in the search result presenting area 603.

Figure 6F:
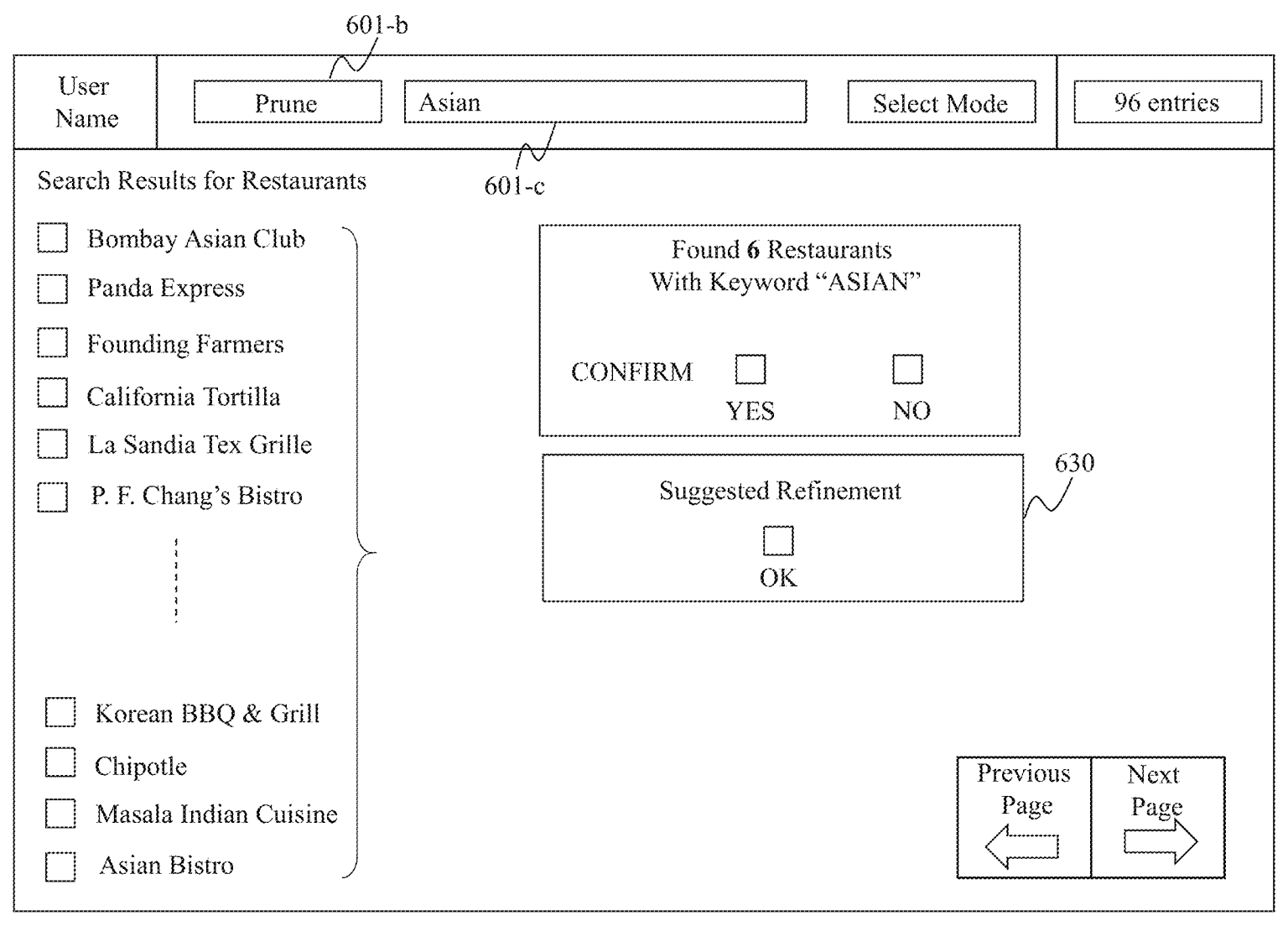

FIG. 6F illustrates a filtering operation initiated by the user, wherein the user selects the suggested refinement option in the pop-up block 630 to refine the search result. In this case, the search results pruning unit determines items in the search result that are related to the keyword 'Asian'. For instance, by utilizing a taxonomy model, the search results pruning unit identifies twenty four items in the search result that are classified as Chinese restaurants, 18 entries in the search result that are classified as Indian restaurants, 15 entries classified as Japanese restaurants, 10 restaurants classified as Vietnamese restaurants, and 5 restaurants classified as Korean restaurants. It must be appreciated that each of the Chinese, Indian, Japanese, Vietnamese, and Koran restaurants are related to the keyword 'Asian'. The search results pruning unit clusters the related restaurants and provides the user an option (suggested pruning 640) to filter the search result based on a selection of any one or more of these clusters.

Figure 6H:
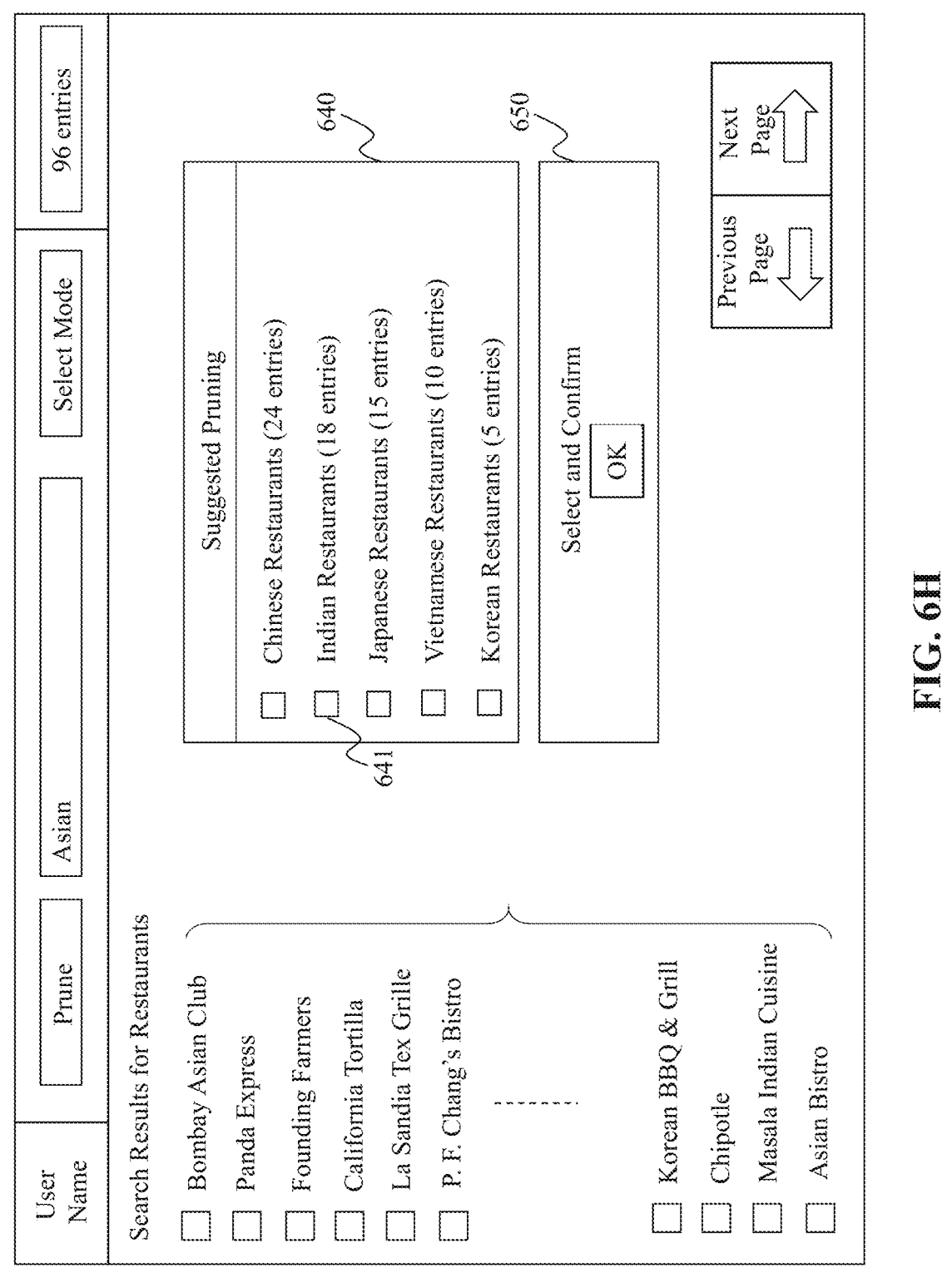

As shown in FIG. 6H, upon the user selecting a particular cluster of restaurants (e.g., Indian restaurants 641), and confirming the suggested refinement in 650, the search results pruning unit discards all the eighteen Indian restaurants (from the original total of ninety six restaurants) from the cache and provides the remaining restaurants (i.e., seventy eight restaurants) as the updated search result 645 to the user as shown in FIG. 6I.

Figure 7:
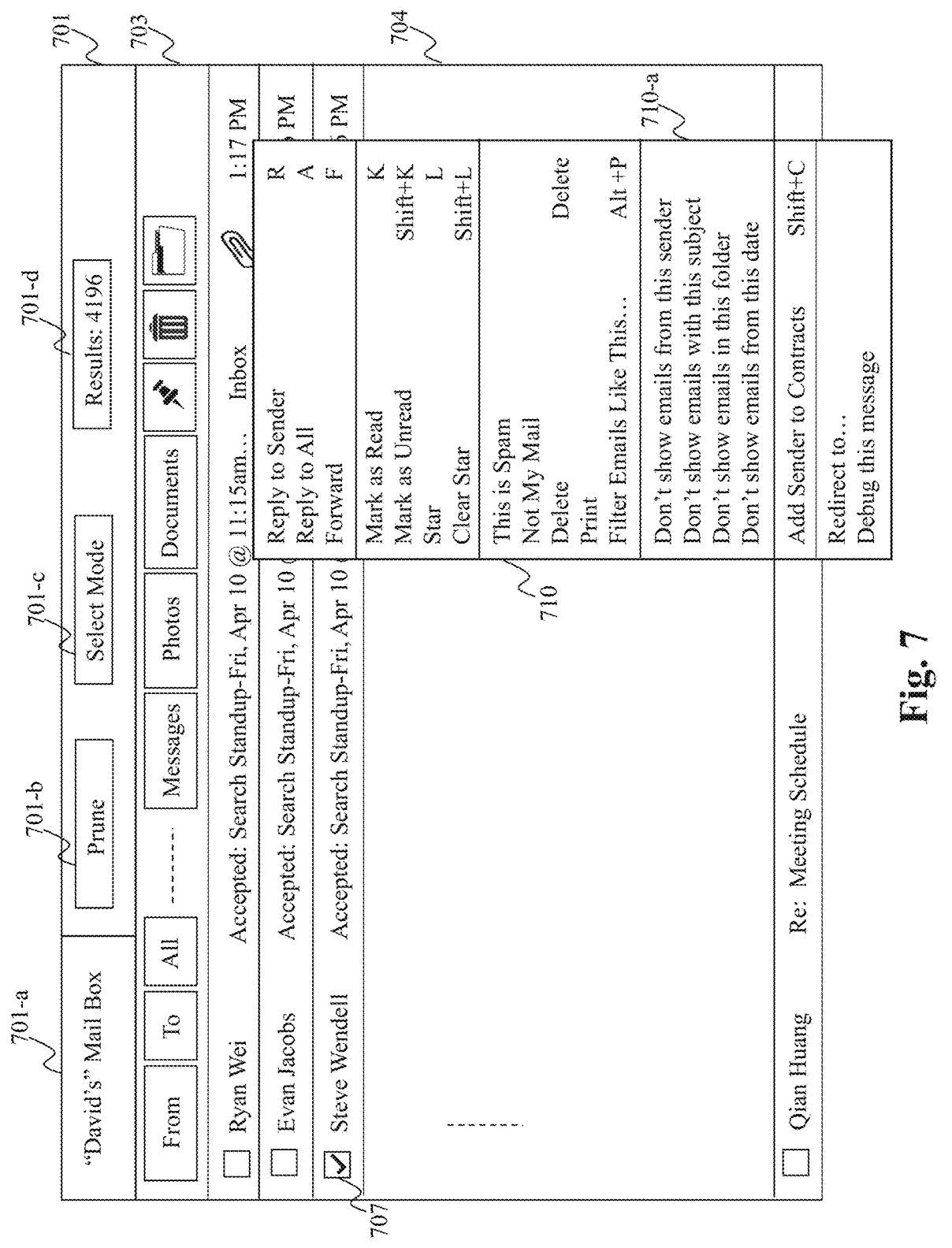

FIG. 7 illustrates an exemplary interface depicting search result pruning of email content of a user, according to various embodiments of the present disclosure. As shown in FIG. 7, the graphical interface includes a toolbars 701 and 703, and a content (i.e., emails) presenting area 704. The toolbar 701 includes a portion 701-*a*, which displays a name of the user (owner of the email account), a result icon 701-*d* that displays a number of items, a pruning icon 701-*b*, and a select mode icon 701-*c*. The pruning icon 701-*b*, and the select mode icon 701-*c* may be adapted to receive a user input (e.g., via a touch operation performed by the user) to perform respective functions.

Each of the emails depicted in the content presenting area 704 includes a selection tab 707. This provides the user the option to select an email from a particular sender (e.g., email sent from Steve Wendell). Upon selecting a particular email, the user is provided with a plurality of action items 710, which include a plurality of filtering options 710-*a*. For instance, as shown in FIG. 7, the user may be provided with options such as 'don't show emails from this sender', 'don't show emails from with this subject', 'don't show emails in this folder', 'don't show emails from this date', and the like. Upon the user selecting at least one filtering option and initiating the pruning operation, the search results pruning unit processes the email content based on the filtering selection and provides the user with an updated search result. Thus, the search results pruning unit provides users with an option to exclude certain entities, keywords etc, from existing content. For example, as described above, the search results pruning unit provides the user an option to search through all emails except their personal emails, or search through all emails excluding those sent from a particular sender and the like.

In the above-described embodiments, it must be appreciated that in addition to the search results pruning unit enabling the user to perform filtering operations to exclude certain keywords or entities from search results, the search results pruning unit also improves user engagement by providing an improved search experience. For example, the search results pruning unit reduces latency in obtaining desired search results. Specifically, only the initial search result is obtained from the search server. Thereafter, any filtering operation is performed on content that is stored in a local cache of the search results pruning unit. In this manner, the search results pruning unit avoids server-response time by not requiring successive calls to be made to the search server in order to obtain the filtered results. Moreover, it must be appreciated that the search results pruning techniques as described herein are in no way limited to be applied to only email content or content of a specific type. Rather, the techniques of the above-described embodiments are equally applicable to any type of content obtained from diverse sources.

Turning now to FIG. 8, there is depicted an architecture of a mobile device 800 which can be used to realize a specialized system implementing the present teaching. In this example, a user device on which the functionalities of the search results pruning system as described herein can be implemented is a mobile device 800, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 800 in this example includes one or more central processing units (CPUs) 840, one or more graphic processing units (GPUs) 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870, e.g., iOS, Android, Windows Phone, etc., and one or more applications 880 may be loaded into the memory 860 from the storage 890 in order to be executed by the CPU 840. The applications 880 may include a browser or any other suitable mobile apps for performing the various functionalities of the search results pruning system on the mobile device 800. User interactions with the content displayed on the display panel 820 may be achieved via the I/O devices 850.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 9 is an illustrative diagram of an exemplary computer system architecture, in accordance with various embodiments of the present teaching. Such a specialized system incorporating the present teaching has a functional block diagram illustration of a hardware platform which includes user interface elements. Computer 900 may be a general-purpose computer or a special purpose computer. Both can be used to implement a specialized system for the present teaching. Computer 900 may be used to implement any component of the search results pruning unit 210, as described herein. For example, the search results pruning unit may be implemented on a computer such as computer 900 via its hardware, software program, firmware, or a combination thereof. Although only one such computer is depicted, for convenience, the computer functions relating to search results pruning system as described herein may be implemented in a distributed fashion on a number of similar platforms, to distribute the processing load.

Computer 900, for example, may include communication ports 950 connected to and from a network connected thereto to facilitate data communications. Computer 900 also includes a central processing unit (CPU) 920, in the form of one or more processors, for executing program instructions. The exemplary computer platform may also include an internal communication bus 910, program storage and data storage of different forms (e.g., disk 970, read only memory (ROM) 930, or random access memory (RAM) 940), for various data files to be processed and/or communicated by computer 900, as well as possibly program instructions to be executed by CPU 920. Computer 900 may also include an I/O component 960 supporting input/output flows between the computer and other components therein such as user interface elements 980. Computer 900 may also receive programming and data via network communications.

Hence, aspects of the methods for pruning search results as outlined above may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search results pruning system into the hardware platform(s) of a computing environment or other system implementing a computing environment or similar functionalities in connection with search result pruning. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the teachings as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a search results pruning server having at least one processor, storage, and a communication platform capable of connecting to a network for providing search results, the method comprising:
   obtaining, by a search results pruning server from a search server, a search result associated with a search query;
   storing, by the search results pruning server, the search result in a local cache of the search results pruning server;
   presenting, by the search results pruning server to a user via a graphical user interface (GUI), search items included in the search result;
   receiving, by the search results pruning server via the GUI, a filtering request from the user, wherein the filtering request specifies a keyword;
   determining, by the search results pruning server, one of a plurality of filtering modes that the user indicates via a mode icon on the GUI, wherein the plurality of filtering modes comprise a first filtering mode to remove one or more of the search items including an entity that matches the keyword and a second filtering mode to keep the one or more of the search items including an entity that matches the keyword, and wherein the user selecting the mode icon indicates selection of one of the first and second filtering modes and the user not selecting the mode icon indicates selection of the other one of the first and second filtering modes; and
   based on the selection of the first filtering mode, presenting, by the search results pruning server to the user via the GUI, an updated search result that includes at least one of the search items not having an entity matching the keyword without the one or more of the search items having an entity matching the keyword.

2. The method of claim 1, further comprising:
   based on the selection of the second filtering mode, presenting, by the search results pruning server to the user via the GUI, an updated search result that includes the one or more of the search items including an entity matching the keyword without the at least one of the search items not having an entity matching the keyword.

3. The method of claim 2, further comprising:

extracting, by the search results pruning server based on the search result stored at the local cache, an entity from each search item included in the search result; and tagging the search items based on the extracted entity matching the keyword.

4. The method of claim 3, further comprising:

discarding, from the local cache, each tagged search item in response to the first filtering mode; and providing each search item of the search items that is untagged to the user, a plurality of untagged items corresponding to the updated search result.

5. The method of claim 3, further comprising:

discarding, from the local cache, each untagged search item in response to the second filtering mode; and providing tagged search items to the user, the tagged search items corresponding to the updated search result.

6. The method of claim 1, further comprising:

determining, based on the keyword, a set of search items included in the search result that are related to each other in accordance with a taxonomy model;

generating a plurality of clusters based on the set of items in accordance with a clustering model; and providing the plurality of clusters to the user.

7. The method of claim 6, further comprising:

receiving from the user, a selection of at least one cluster of the plurality of clusters;

pruning the plurality of clusters based on the selection; and providing, in response to receiving to selection, the pruned plurality of clusters to the user.

8. A system for providing search results, the system comprising:

a search results processing unit implemented by a processor and configured to obtain, from a search server, a search result associated with a search query;

a result storing unit implemented by the processor and configured to store the search result in a local cache;

a results transmitting unit implemented by the processor and configured to present, via a graphical user interface (GUI) to a user, search items included in the search result;

a results updating unit implemented by the processor and configured to receive, via the GUI, a filtering request from the user, wherein the filtering request specifies a keyword; and a mode determiner implemented by the processor and configured to determine one of a plurality of filtering modes that the user indicates via a mode icon on the GUI, wherein the plurality of filtering modes comprise a first filtering mode to remove one or more of the search items including an entity that matches the keyword and a second filtering mode to keep the one or more of the search items including an entity that matches the keyword, and wherein the user selecting the mode icon indicates selection of one of the first and second filtering modes and the user not selecting the mode icon indicates selection of the other one of the first and second filtering modes, and wherein the results transmitting unit is further configured to present, based on the selection of the first filtering mode, to the user via the GUI, an updated search result that includes at least one of the search items not having an entity matching the keyword without the one or more of the search items having an entity matching the keyword.

9. The system of claim 8, wherein the results transmitting unit is further configured to:

based on the selection of the second filtering mode, present to the user via the GUI, an updated search result that includes the one or more of the search items including an entity matching the keyword without the at least one of the search items not having an entity matching the keyword.

10. The system of claim 9, further comprising:

an entity extraction unit implemented by the processor and configured to extract an entity from each of the search items; and a tagging/updating unit implemented by the processor and configured to tag the search item based on the entity matching the keyword.

11. The system of claim 10, wherein the tagging/updating unit is further configured to discard, from the local cache, each tagged search item in response to the first filtering mode, and the results transmitting unit is further configured to provide each search item of the search items that is untagged to the user, a plurality of untagged search items corresponding to the updated search result.

12. The system of claim 10, wherein the tagging/updating unit is further configured to discard, from the local cache, each untagged search item in response to the second filtering mode, and the results transmitting unit is further configured to provide tagged search items to the user, the tagged search items corresponding to the updated search result.

13. The system of claim 8, further comprising:

a related results determination unit implemented by the processor and configured to determine, based on the keyword, a set of search items included in the search result that are related to each other in accordance with a taxonomy model; and a clustering unit implemented by the processor and configured to generate a plurality of clusters based on the set of items in accordance with a clustering model, and wherein the results transmitting unit is further configured to provide the plurality of clusters to the user.

14. The system of claim 13, wherein the results updating unit is further configured to receive from the user, a selection of at least one cluster of the plurality of clusters;

the filtering unit is further configured to prune the plurality of clusters based on the selection; and the results transmitting unit is further configured to provide, in response to receiving to selection, the pruned plurality of clusters to the user.

15. A non-transitory computer readable medium including computer executable instructions, wherein the instructions, when executed by a computer, cause the computer to perform a method for providing search results, the method comprising:

obtaining, from a search server, a search result associated with a search query;

storing the search result in a local cache of the computer;

presenting, by the search results pruning server to a user via a graphical user interface (GUI), search items included in the search result;

receiving, via the GUI, a filtering request from the user, wherein the filtering request specifies a keyword;

determining one of a plurality of filtering modes that the user indicates via a mode icon on the GUI, wherein the plurality of filtering modes comprise a first filtering mode to remove one or more of the search items including an entity that matches the keyword and a second filtering mode to keep the one or more of the search items including an entity that matches the keyword, and wherein the user selecting the mode icon indicates selection of one of the first and second filtering modes and the user not selecting the mode icon indicates selection of the other one of the first and second filtering modes; and based on the selection of the first filtering mode, presenting, to the user via the GUI, an updated search result that includes at least one of the search items not having an entity matching the keyword without the one or more of the search items having an entity matching the keyword.

16. The non-transitory computer readable medium of claim 15, wherein the method further comprises:

based on the selection of the second filtering mode, presenting, to the user via the GUI, an updated search result that includes the one or more of the search items including an entity matching the keyword without the at least one of the search items not having an entity matching the keyword.

17. The non-transitory computer readable medium of claim 16, the method further comprising:

extracting, based on the search result stored at the local cache, an entity from each search item included in the search result; and tagging the search items based on the extracted entity matching the keyword.

18. The non-transitory computer readable medium of claim 17, the method further comprising:

discarding, from the local cache, each tagged search item in response to the first filtering mode; and providing each search item of the search items that is untagged to the user, a plurality of untagged items corresponding to the updated search result.

19. The non-transitory computer readable medium of claim 17, the method further comprising:

discarding, from the local cache, each untagged search item in response to the second filtering mode; and providing tagged search items to the user, the tagged search items corresponding to the updated search result.

20. The non-transitory computer readable medium of claim 15, the method further comprising:

determining, based on the keyword, a set of search items included in the search result that are related to each other in accordance with a taxonomy model;

generating a plurality of clusters based on the set of items in accordance with a clustering model; and providing the plurality of clusters to the user.

* * * * *